US008609175B2

(12) United States Patent
Dalemans

(10) Patent No.: US 8,609,175 B2
(45) Date of Patent: Dec. 17, 2013

(54) METHOD OF REDUCING THE SATURATED FATTY ACID CONTENT OF MILK FAT

(75) Inventor: Daniel Dalemans, Herstal (BE)

(73) Assignee: S.A. Corman, Goe (BE)

( * ) Notice: Subject to any disclaimer, the term of this patent is extended or adjusted under 35 U.S.C. 154(b) by 519 days.

(21) Appl. No.: 12/740,611

(22) PCT Filed: Oct. 24, 2008

(86) PCT No.: PCT/EP2008/064444
§ 371 (c)(1),
(2), (4) Date: Jul. 14, 2010

(87) PCT Pub. No.: WO2009/056493
PCT Pub. Date: May 7, 2009

(65) Prior Publication Data
US 2010/0297293 A1    Nov. 25, 2010

(30) Foreign Application Priority Data

Oct. 29, 2007  (EP) .................................. 07119534

(51) Int. Cl.
| | | |
|---|---|---|
| C11B 7/00 | (2006.01) | |
| C11B 3/12 | (2006.01) | |
| A23C 15/02 | (2006.01) | |
| A23D 9/00 | (2006.01) | |
| A23C 15/00 | (2006.01) | |

(52) U.S. Cl.
USPC ........... 426/613; 426/581; 426/425; 426/424; 426/34

(58) Field of Classification Search
USPC .................................. 426/613, 581, 424, 425
See application file for complete search history.

(56) References Cited

U.S. PATENT DOCUMENTS 5,069,915 A    12/1991  Devitt et al.
6,140,520 A *  10/2000  Hartel et al. .................. 554/211

FOREIGN PATENT DOCUMENTS

| EP | 2 055 195 | 5/2009 |
|---|---|---|
| GB | 1 559 064 | 1/1980 |
| JP | 8311482 | 11/1996 |
| WO | WO 01/83655 | 11/2001 |
| WO | WO 2007/029015 | 3/2007 |

OTHER PUBLICATIONS

Deffense, E. 1993. JAOCS 70(12)1193.*
Peters-Erjawetz, S. et al. 1999. JAOCS 76(5)579.*
Grail, D. S. 1992. JAOCS 69(8)741.*
Noakes, M. et al. 1996. Am. J. Clin Nutr. 63:42.*
Lawless, F. et al 1998. Journal of Dairy Science 81:3259.*
Sherbon, J. W. et al. 1973. Journal of Dairy Science 56(1)52.*
Rolland, J. R. 1966. Journal of Dairy Science 49(6)608.*
Paccard et al., "Maitrise de la matiere grasse du lait par l'alimentation des vaches laitieres," Etude bibliographique et simulations technico-economiques, Collection resultats (Jul. 2006) Onilait (2 rue Saint Charles, 75740 Paris Cedex 15) and Institut de l'Elevage (149 rue de Bercy, 75595 Paris Cedex 12), Compte rendu 030631012. (Paccard et al., "Controlling fat in milk by dairy cow diet," Etude bibliographique et simulations technicoeconomiques, Collection resultats (Jul. 2006) Onilait (2 rue Saint Charles, 75740 Paris Cedex 15) and Institut de l'Elevage (149 rue de Bercy, 75595 Paris Cedex 12), Compte rendu 030631012.) 23552 Patent Trademark Office.
Laasko et al., "Composition of the triacylglycerols of butterfat and its fractions obtained by an industrial melt crystallization process," J. Agric. Food Chem. (1992) 40: 2472-2482. XP002478255.
Kemppinen et al., "Fractionation of the triacylglycerols of lipase-modified butter oil," JAOCS (1993) 70 (12): 1203-1207. XP002478254.
Balcão et al., "Lipase catalyzed motification of milkfat," Biotechnology Advances (1998) 16 (2): 309-341 XP004113266.
Arul et al., "Fractionation of anhydrous milk fat by short-path distillation," JAOCS (1988) 65 (10):1642-1646 XP000020082.
Lopez et al., "Milk fat and primary fractions obtained by dry fractionation 1. Chemical composition and crystallization properties," Chemistry and Physics of Lipids (2006) 144: 17-33. XP005706492.
Bystrom et al., "Evaulation of milk fat fractionation and modification techniques for creating cocoa butter replacers," Lebensmittel-Wissenschaft and Technologie (1994) 27 (2): 142-150. XP002478253.
Paccard et al., "Maitrise de la matiere grasse du lait par l'alimentation des vaches laitieres," Etude bibliographique et simulations technico-economiques, Collection resultats (Jul. 2006) Onilait (2 rue Saint Charles, 75740 Paris Cedex 15) and Institut de l'Elevage (149 rue de Bercy, 75595 Paris Cedex 12), Compte rendu 030631012.
Poppitt et al., "Lipid-lowering effects of a modified butter-fat: A controlled intervention trial in healthy men," European Journal of Clinical Nutrition (2002) 56: 64-71.
Rumentek <file:///C:/r0/Nutrition/Lipides ag/Rumentek/rumentek(1-8).htm> Accessed May 23, 2005.
Osthoff et al., "The composition of serval (Felis serval) milk during mid-lactation," Comparative Biochemistry and Physiology, Part B (2007) 147: 237-241.
Campos et al., "Fractionation of milk fat by short-path distillation," J. Dairy Sci. (2003) 86: 735-745.
Arul et al., "Distribution of Cholesterol in Milk Fat Fractions", Journal of Dairy Research, vol. 55, 1988, pp. 361-371.
Chen et al., "Composition of Milk Fat Fractions Obtained by Fractional Crystallization from Acetone", Journal of Dairy Science vol. 49, 1966, pp. 612-616.
Garti et al., Crystallization Processes in Fats and Lipid Systems, Marcel Dekker Inc., 2001, pp. 366-367.
Gulati et al., "Effect of Feeding Different Fat Supplements on the Fatty Acid Composition of Goat Milk", Animal Feed Science Technology vol. 66, 1997, pp. 159-164.
Hoffman, The Chemistry and Technology of Edible Oils and Fats and their High Fat Products, Academic Press, 1989, pp. 244-261.
Jenkins, "Fatty Acid Composition of Milk from Holstein Cows Fed Oleamide or Canola Oil", Journal of Dairy Science, vol. 81, 1998, pp. 794-800.

(Continued)

Primary Examiner — Carolyn Paden
(74) Attorney, Agent, or Firm — Merchant & Gould P.C.

(57) ABSTRACT

The present invention is related to a method for reducing the saturated fatty acid content of milk fat. The milk fat is subjected to fractional crystallization to recover an olein fraction. Then the olein fraction is subjected to short path distillation to obtain a residual milk fat fraction that has not been evaporated and has a reduced saturated fatty acid content.

5 Claims, No Drawings

(56) References Cited

OTHER PUBLICATIONS

Jenny et al., "Acetate and Stearate Utilization by Lactating Cows Fed High Grain-Restricted Roughage Rations", *Journal of Dairy Science*, vol. 55, No. 10, 1971, pp. 1481-1486.

Lanzani et al., "A New Short-Path Distillation System Applied to the Reduction of Cholesterol in Butter and Lard", *Journal of the American Oil Chemist Society* vol. 71 No. 6, 1994, pp. 609-614.

Minifie, *Chocolate, Cocoa and Confectionery: Science and Technology Second Edition*, 1980, pp. 80-81.

Wood et al., "Influence of Elevated Polyunsaturated Fatty Acids on Processing and Physical Properties of Butter", *Journal of Dairy Science*, vol. 58, No. 6, 1974, pp. 839-845.

Weedrow et al., "Distribution of Trans-Unsaturated Fatty Acids in Milk Fat", *Biochimica et Biophysica Acta* vol. 152, 1968, pp. 472-478.

\* cited by examiner

METHOD OF REDUCING THE SATURATED FATTY ACID CONTENT OF MILK FAT

This application is a National Stage Application of PCT/EP2008/064444, filed Oct. 24, 2008, which claims benefit of Ser. No. 07/119,534.1, filed Oct. 29, 2007 in the EPO and which applications are incorporated herein by reference. To the extent appropriate, a claim of priority is made to each of the above disclosed applications.

FIELD OF THE INVENTION

The present invention is related to a method for reducing saturated fatty acid content of a milk fat from ruminant, preferably cattle milk fat, more preferably cow milk fat, to this ruminant milk fat, preferably cattle or cow milk fat, which includes a reduced saturated fatty acid content, preferably obtained by the method of the invention as well as to food compositions derived from this ruminant preferably cattle or cow milk fat and to their applications.

TECHNOLOGICAL BACKGROUND AT THE BASE OF THE INVENTION

Like all food fats, milk fat mainly consists of triglycerides (98%), which are triesters of fatty acids and glycerol. Milk fat is characterized by a large variety of fatty acids (at least ten main different fatty acids) and by a large variety of triglycerides which are combinations of these fatty acids.

Fatty acids with a short chain of 4-10 carbons which are essentially saturated, fatty acids with a long chain of 12-18 carbons which are mainly saturated and mono-unsaturated, and poly-unsaturated fatty acids with a long chain, which are present in an amount of only about 3%, may notably be mentioned; the unsaturated fatty acids are mainly in a <<cis>> configuration, but there are some in a <<trans>> configuration.

These fatty acids mainly have an even number of carbon atoms, but there also exists a small proportion of fatty acids with an odd number of carbon atoms (especially with 15 and 17 carbon atoms).

Furthermore, triglycerides are either triglycerides with a short chain ($C_{36}$-$C_{42}$) containing a short chain fatty acid, or triglycerides with a long chain ($C_{44}$-$C_{54}$) only containing long chain fatty acids. All these triglycerides are either tri-saturated, i.e. they only contain saturated fatty acids, or unsaturated, i.e. they contain one or more unsaturated fatty acids.

Milk fat and food products which are rich in milk fat (such as butter, cream, cheeses . . . ) suffer from a bad nutritional image, because the high saturated fatty acids and the cholesterol contents of this fat discourage their use.

The fatty acid composition of a dairy fat is shown in Table 1.

Upon reading this Table 1, it is observed that the cow milk fatty acid fat contains 65.5% of saturated fatty acids, 31% of mono-unsaturated (<<cis>> and <<trans>>) and about 3.5% of poly-unsaturated (<<cis>> and <<trans>>) fatty acids, these levels being expressed in weight percent over the sum of all the fatty acids reduced to 100%, a sum also called total fatty acids.

Further, this fatty acid composition varies depending on the seasons and on the feeding of milk cows; in spring and summer, milk fat is less saturated, because of feed essentially consisting of fresh grass providing a significant amount of unsaturated fatty acids, whereas in winter, the feed of the cattle (preserved fodder) causes a modification in the dairy fat composition which is enriched with saturated fatty acids.

TABLE 1

| Fatty acids (weight %): | Winter milk fat | Summer milk fat | Average |
|---|---|---|---|
| C4 | 3.7 | 3.6 | 3.7 |
| C6 | 2.5 | 2.1 | 2.3 |
| C8 | 1.5 | 1.2 | 1.4 |
| C10 | 3.1 | 2.5 | 2.8 |
| C10:1 | 0.3 | 0.3 | 0.3 |
| C12 | 4.0 | 3.0 | 3.5 |
| C14 | 11.8 | 9.1 | 10.4 |
| C14:1 | 2.0 | 2.0 | 2.0 |
| C15 | 1.2 | 1.1 | 1.2 |
| C16 | 32.4 | 24.2 | 28.3 |
| C16:1 | 2.6 | 2.6 | 2.6 |
| C17 | 0.8 | 0.6 | 0.7 |
| C17:1 | 0.2 | 0.3 | 0.3 |
| C18 | 9.7 | 13.0 | 11.3 |
| C18:1 cis | 18.5 | 25.4 | 22.0 |
| C18:1 trans | 2.8 | 4.8 | 3.8 |
| C18:2 cis-cis | 2.1 | 2.3 | 2.2 |
| C18:2 conj. cis – trans | 0.4 | 1.0 | 0.7 |
| C18:3 | 0.3 | 0.8 | 0.6 |
| Sum of saturated fatty acids | 70.8 | 60.5 | 65.6 |
| Sum of mono-unsaturated (cis + trans) fatty acids | 26.4 | 35.4 | 30.9 |
| Sum of polyunsaturated (cis + trans) fatty acids | 2.8 | 4.1 | 3.5 |

As the milk material is animal fat, it contains cholesterol (280 mg for 100 g). However, nutritional recommendations recommend that cholesterol food intake be limited to a maximum of 300 mg per day. Consequently, improving the nutritional image of milk fat involves reducing its cholesterol content and its saturated fatty acid content.

STATE OF THE ART

Presently, extraction of cholesterol from milk fat is achieved industrially by physical methods such as molecular encapsulation by means of a cyclodextrin or by steam stripping. With these methods, a minimum of 75% of the initially present cholesterol may be extracted.

Also, methods for reducing the saturated fatty acid content of dairy fat exist but give clearly insufficient results.

Indeed, these are breeding practices requiring specific feeding of dairy animals (cows). Indeed, it is possible to change the feed of dairy animals (cows) by providing them with fodder enriched with poly-unsaturated fatty acids (for example, feed based on linseed oil, soybean oil).

The effects of this feed are especially remarkable in winter where a comparison is observed with a winter ration based on hay or silages. However, these effects are very limited during the other seasons where the animal (cattle) feed on grass (because fresh grass is rich in poly-unsaturated fatty acids of the omega-3 type). Oils provided in the feed intended for animals (cattle) undergo significant biohydrogenation in the rumen of the cow, which causes a significant increase in the level of unsaturated fatty acids in a <<trans>> type conformation in (cattle) milk fat, which is not necessarily desirable given the reserved position of nutrition scientists on the qualities of <<trans>> type fatty acids. This effect partly reduces the advantage of reducing the obtained saturated fatty acids.

A protection of the unsaturated oil provided in the feed allows biohydrogenation to be limited. This is the practice recommended by Rumentek (Australia). This effect is obtained by the protective shell which consists of substances non-degraded by the microorganisms of the rumen. With the best results announced by these practices of changing the feed of the dairy cow, it is possible to obtain a relative reduction in the saturated fatty acid level from 20 to 25%, the saturated fatty acid level passing from 70.5 to 54.4% (a 16.1% reduction in absolute value).

(Poppitt, S. D. et al. 2002. Lipid-lowering effects of a modified butter-fat: a controlled intervention trial in healthy men, European Journal of Clinical Nutrition, 56, 64-71).

However, in addition to the reduction in saturated fatty acids of the (cattle) fat, this method requires an oil-enriched feed intended for animals (cattle), which causes breeding and selective collection constraints which will increase the cost of the obtained dairy product. Further, this change in the feed of dairy animals (cattle such as cows) causes a lowering of the fat content in their milk, or even of the protein level.

(Paccard P., Chenais F., Brunschwig P. July 2006. Maîtrise de la matière grasse du lait par l'alimentation des vaches laitières, Etude bibliographique et simulations technico-économiques, Collection résultats, Onilait (2 rue Saint Charles, 75740 Paris Cedex 15) and Institut de l'Elevage (149 rue de Bercy, 75595 Paris Cedex 12), Compte rendu 030631012.

Another possibility for reducing saturated fatty acid content in milk fat consists of achieving multi-step fractionation of milk fat by crystallization. Multi-step fractionation of fats by crystallization is applied to so-called hardstock fats (plastic at room temperature) like palm oil or milk fat. With this technique, it is possible to obtain harder and softer (or even liquid) fractions better suitable for some applications (for example hard butters for pastry-making, soft and spreadable butters for the consumer, etc. . . . ).

This technology is based on partial crystallization of triglycerides with a high melting point caused by controlled slow cooling under mild stirring and then on their separation from the remaining oil by a filtration or centrifugation operation. The solid phase formed by the crystals is called stearin and the remaining oil or liquid phase is called olein. The operation may be repeated in multiple ways on oleins obtained by new cooling at a lower temperature.

Starting from a solid fat, an olein fraction may thus be obtained with a very low melting point (up to 5° C.) These successive operations performed on the olein obtained in the previous steps are called multi-step fractionations. In this process, the high melting point triglycerides crystallize first; at lower temperatures, they are followed by medium melting point triglycerides. As these triglycerides especially consist of saturated fatty acids, reduction of their concentration in residual liquid phases (the oleins) consequently causes a reduction in the content of these saturated fatty acids. Table 2 below shows the yield of oleins obtained by the multi-step fractionation of milk fat as well as their reduced content of saturated fatty acids.

TABLE 2

|  | Start | Olein 20° C. | Olein 15° C. | Olein 10° C. | Olein 5° C. |
|---|---|---|---|---|---|
| Fractionation yield |  | 67% | 67% | 67% | 55% |
| Yield relative to the start | 100% | 67% | 45% | 30% | 17% |
| Fatty acids (weight %): |  |  |  |  |  |
| C4 | 3.7 | 4.0 | 4.1 | 4.2 | 4.3 |
| C6 | 2.3 | 2.6 | 2.7 | 2.7 | 2.8 |
| C8 | 1.4 | 1.5 | 1.5 | 1.6 | 1.7 |
| C10 | 2.8 | 3.0 | 3.1 | 3.2 | 3.5 |
| C10:1 | 0.3 | 0.3 | 0.3 | 0.3 | 0.4 |
| C12 | 3.5 | 3.6 | 3.8 | 3.8 | 4.0 |
| C14 | 10.4 | 10.4 | 10.4 | 10.1 | 9.3 |
| C14:1 | 2.0 | 2.0 | 2.3 | 2.4 | 2.6 |
| C15 | 1.2 | 1.0 | 1.0 | 0.9 | 0.9 |
| C16 | 28.3 | 27.0 | 23.9 | 21.2 | 19.1 |
| C16:1 | 2.6 | 2.9 | 3.4 | 3.6 | 4.0 |
| C17 | 0.7 | 0.6 | 0.6 | 0.5 | 0.4 |
| C17:1 | 0.3 | 0.4 | 0.4 | 0.4 | 0.5 |
| C18 | 11.3 | 9.7 | 8.3 | 7.6 | 6.3 |
| C18:1 cis + trans | 25.8 | 27.2 | 30.0 | 32.3 | 35.0 |
| C18:2 cis-cis | 2.2 | 2.4 | 2.7 | 3.0 | 3.3 |
| C18:2 conj. cis – trans | 0.7 | 0.9 | 1.0 | 1.1 | 1.2 |
| C18:3 | 0.6 | 0.6 | 0.7 | 0.8 | 0.9 |
| Sum of saturated fatty acids | 65.6 | 63.3 | 59.4 | 56.0 | 52.4 |
| Sum of mono-unsaturated (cis + trans) fatty acids | 30.9 | 32.8 | 36.3 | 39.1 | 42.3 |
| Sum of polyunsaturated (cis + trans) fatty acids | 3.5 | 3.9 | 4.3 | 4.9 | 5.3 |

Table 2 shows that reduction in saturated fatty acids is limited to about 13% in absolute value (20% in relative value) for oleic fractions with the lowest melting point (5° C.). However, by fractionated crystallization, this reduction cannot be improved because of the setting of milk fat at temperatures below 4 or 5° C.

A third method for reducing saturated fatty acid content of milk fat consists in fractionating milk fat by short path distillation (also called molecular distillation). Distillation is a standard method for fractionating liquids consisting of a mixture of compounds having different evaporation temperatures. A fraction designated as <<distillate>> consists of the compounds which have vaporized and which are recovered after condensation. A fraction termed <<residual>> forms the remainder of the mixture which has not been vaporized. Molecular distillation (short-path distillation) is a vacuum distillation method characterized by a reduced distance between the evaporator and the condenser. With this small distance, it is possible to achieve separations of compounds with close evaporation properties, whence the French term of molecular distillation (short path distillation) which recalls the high selectivity of this separation technique.

Application of short path (molecular) distillation to fractionation of milk fat was studied by Campos R. J et al (2003, Journal of Dairy Science, 86, 735-745.), (Arul, J. et al. 1988, J. Am. Oil Chem. Soc. 65, 1642-1646). The studies of these authors show that since the separation principle is based on molecular weight, the short chain triglycerides are the ones which distill first; as the latter are more saturated, the distillates are slightly enriched with saturated fatty acids unlike the residues. It appears that the reduction of saturated fatty acids in the residues would be of the order of 5-10% for the highest distillation temperatures The inventors conducted short path (molecular) distillation tests on a summer (cow) milk fat (temperature 200-260° C., vacuum of 0.001 mbar). The result of the fatty acid composition of the <<residual>> fractions is given in Table 3 which shows the yield and fatty acid composition of the (cow) milk fat and of the <<residual>> fractions obtained by short path (molecular) distillation.

TABLE 3

| | start | 210° C. | 230° C. | 250° C. | 260° C. |
|---|---|---|---|---|---|
| Yield of residual fraction | | 88% | 70% | 46% | 32% |
| Fatty acids (weight %) | | | | | |
| C4 | 3.7 | 2.9 | 1.9 | 0.8 | 0.3 |
| C6 | 2.5 | 2.1 | 1.6 | 0.8 | 0.4 |
| C8 | 1.5 | 1.3 | 1.1 | 0.7 | 0.4 |
| C10 | 3.4 | 2.9 | 2.7 | 1.9 | 1.4 |
| C10:1 | 0.3 | 0.2 | 0.2 | 0.2 | 0.1 |
| C12 | 4.0 | 3.5 | 3.2 | 2.8 | 2.2 |
| C14 | 10.8 | 10.1 | 9.5 | 8.8 | 7.9 |
| C14:1 | 1.6 | 1.6 | 1.6 | 1.6 | 1.4 |
| C15 | 1.2 | 1.2 | 1.2 | 1.1 | 1.0 |
| C16 | 24.4 | 24.4 | 23.6 | 22.9 | 22.3 |
| C16:1 | 2.6 | 2.6 | 2.7 | 2.7 | 2.7 |
| C17 | 0.8 | 0.8 | 0.8 | 0.9 | 0.9 |
| C17:1 | 0.4 | 0.4 | 0.4 | 0.4 | 0.4 |
| C18 | 10.9 | 11.6 | 12.4 | 13.4 | 14.3 |
| C18:1 cis + trans | 27.5 | 29.4 | 31.7 | 35.2 | 37.9 |
| C18:2 cis-cis | 2.3 | 2.5 | 2.7 | 3.0 | 3.1 |
| C18:2 conj. cis – trans | 1.4 | 1.5 | 1.7 | 2.0 | 2.2 |
| C18:3 | 0.8 | 0.8 | 0.9 | 1.0 | 1.0 |
| Sum of saturated fatty acids | 63.2 | 60.8 | 58.1 | 54.0 | 51.1 |
| Sum of mono-unsaturated (cis + trans) fatty acids | 32.3 | 34.3 | 36.6 | 40.1 | 42.6 |
| Sum of polyunsaturated (cis + trans) fatty acids | 4.5 | 4.9 | 5.3 | 5.9 | 6.3 |

The reduction in saturated fatty acids attains 12% at 260° C. At this temperature, the <<residual>> fraction represents about one third of the initial (cow) milk fat and is depleted in saturated fatty acids and especially in short chain saturated fatty acids. The residual saturated fatty acid level is however still above 50%.

Therefore, the techniques and methods described below provide reduction of the saturated fatty acid level of dairy fat of the order of 65% to about 50-55%, i.e. a reduction of 10-15% in absolute value. These reduction levels are however still insufficient to meet the present nutritional requirements which require a maximum of 30-40% of saturated fatty acids in the finished product. (Cow) milk fat obtained by these methods still remains in majority saturated (more than 50%).

Some milk fats from other species than ruminants may have a low saturated fatty acids content, even close to the nutritional requirements. For instance, Osthoff & al., Comparative Biochemistry and Physiology, Part B, Biochemistry and Molecular Biology Elsevier Oxford GB Volume 147 n° 2, April 2007, discloses the composition of Serval (Felis serval) milk during mid-lactation. The authors have observed that such milk fatty acid of this animal presents a content of saturated fatty acid of 31.3% in weight compared to the total fatty acid present in milk fat. However this milk from cat has a totally different content in protein, lactose and fat. Its fatty acids composition is also completely different from the ruminant milk fat ones, for instance Serval milk is very rich in poly-unsaturated omega 6 fatty acids and the ratio omega 6/omega 3 is higher than 10, which is not ideal in a health or nutrition point of view.

AIMS OF THE INVENTION

The present invention aims to obtain a new method for reducing the saturated fatty acid content of fat, preferably of milk fat, especially milk fat obtained from ruminant, more preferably from cattle or from cow.

Another aspect of the present invention is related to ruminant milk fat, preferably a cattle milk fat or cow milk fat, which presents a reduced saturated fatty acid content and to the method for obtaining it.

Preferably, the present invention is related to this ruminant milk fat, preferably a cattle milk fat or a cow milk fat, having a reduction in its saturated fatty acid content as well as an increase in its mono-unsaturated fatty acids and preferably an increase in omega-6 (linoleic acid C18:2 cis-cis), CLA (conjugated C18:2 cis-translinoleic acid) and omega-3 (C18:3 cis-cis-cis alpha linolenic acid) polyunsaturated fatty acids, with a ratio of omega 6/omega 3 kept constant, and which do not have the drawbacks of the state of the art.

A particular aim of the present invention is to provide such ruminant milk fat, preferably this cattle or cow milk fat, which will present improved nutritional properties and which provide in a food composition
  a maximum level of 50% or less than 40%, or even less than 35%, of saturated fatty acids,
  a minimum level of mono-unsaturated fatty acids with a minimum of 45% or more than 50%, or even more than 55% of mono-unsaturated fatty acids,
  a minimum level of polyunsaturated fatty acids preferably a minimum of 5.5% or more than 6.0%, or even more than 7.0% of polyunsaturated fatty acids without any major modification of the omega-6/omega-3 ratio,
these levels being expressed on basis of the total fatty acids in weight and which further may allow reduction of the cholesterol proportion in this ruminant milk fat, preferably in this cattle or cow milk fat.

The present invention is also directed to food compositions comprising this ruminant milk fat, preferably this cattle milk fat, more preferably this cow milk fat of the invention having improved nutritional properties, in particular food compositions such as dairy products or bakery-confectionery products, ice creams, spreadable butters, etc.

A last aim of the present invention is related to a method for the fractionation at industrial level (for large-scale processing) of milk fat from ruminant animals, preferably from cattle or from cow and to a milk fat obtained from the said method.

SUMMARY OF THE INVENTION

A first aspect of the present invention is related to a ruminant milk fat, preferably a cattle milk fat, more preferably a cow milk fat which has a saturated fatty acid content below 50%, preferably 49%, 48%, 47%, 46%, 45%, 44%, 43%, 42%, 41%, 40%, 39%, 38%, 37%, 36% or even 35%, a mono-unsaturated fatty acid content above 45%, 46%, 47%, 48%, 49%, 50%, 51%, 52%, 53%, 54% or even 55%, preferably a polyunsaturated fatty acid content above 5.5%, 6.0%, 6.5% or even 7.0%, these % being expressed by weight based on the total fatty acids (w:w), as well as to any food application of this milk fat.

In the ruminant milk fat of the invention, the polyunsaturated omega6:omega3 ratio (w:w) is preferably below 10, 9, 8, 7 or even 6.

In the ruminant milk fat of the invention, the polyunsaturated omega 6 content (w:w), consisting preferably of linoleic acid, is preferably kept below 30%, 25%, 20%, 15%, 14%, 13%, 12%, 11%, 10%, 9%, 8%, 7% or even below 6%.

The present invention also relates to the method for obtaining this milk fat which has a saturated fatty acid content below 50%, 49%, 48%, 47%, 46%, 45%, 44%, 43%, 42%, 41%, 40%, 39%, 38%, 37%, 36%, 35%, a monounsaturated fatty acid content above 45%, 46%, 47%, 48%, 49%, 50%, 51%, 52%, 53%, 54% or even 55%, a polyunsaturated fatty acid content above 5.5%, 6.0%, 6.5% or even 7.0%, these % being expressed by weight based on the total fatty acids, wherein the fat of this milk, more particularly a ruminant, cattle or cow milk fat which has a normal composition in fatty acids (as represented in Table 1), is submitted to one or more fractionation steps by crystallization combined with:

a) one or more enzymatic inter-esterification steps followed by one or more new steps of fractionated crystallization, or b) one or more fractionation steps by short path (molecular) distillation.

In the case of a treatment by enzymatic inter-esterification, the method should comprise:

one or more fractionation steps by crystallization, followed by one or more enzymatic inter-esterification steps followed by one or more new fractionation steps by crystallization. Indeed enzymatic inter-esterification does not reduce the saturated fatty acid level, but allows reformation of saturated triglycerides extractable by one or more subsequent fractionation steps by crystallization.

In the case of a treatment by short path (molecular) distillation, the method should comprise:

one or more fractionation steps by crystallization, followed by one or more fractionation steps by short path (molecular) distillation. Indeed, short path (molecular) distillation causes an additional reduction in the saturated fatty acid level of oleic fractions obtained beforehand.

In the method according to the invention, the enzymatic inter-esterification step(s) correspond(s) to an hydrolysis with a lipase at a temperature comprised between 60° C. and 90° C., for a duration above 1 hour, preferably at a temperature of about 70° C. for a duration of about 6 hours.

In the method according to the invention, the water content of the reaction medium of the inter-esterification step is less than 0.1%.

In the method according to the invention, the fractionation steps by short path (molecular) distillation are carried out at evaporation temperatures comprised between 230° C. and 300° C. (preferably in vacuo), more preferably between 230° C. and 270° C. (preferably in vacuo), more preferably at a pressure less then 0.1 mbar, more particularly at a pressure of less than 0.01 mbar.

DETAILED DESCRIPTION OF THE INVENTION

The inventors observe that, by combining the steps of the method of the invention, a modification of the fatty acid composition may be obtained to an unexpected extent in the treated product.

According to a first preferred embodiment of the invention, the method comprises:

a) one or more fractionation steps by crystallization as known to one skilled in the art and therefore corresponding to a preferably multi-step fractionation of the ruminant, cattle or cow milk fat, via partial crystallization of the triglycerides with a high melting point caused by controlled slow cooling under mild stirring and then to a separation of the remaining oil by a filtration or centrifugation operation.

This step or these fractionation steps by crystallization are combined with b) one or more steps for enzymatic inter-esterification of this milk fat, (i.e. the ruminant, cattle or cow milk fat obtained previously), preferably the liquid phase (olein) with a low melting point (more particularly oleins with a 20° C. or 15° C., preferably 10° C. melting point, more particularly a melting temperature of 5° C.) is submitted to a series of reactions for hydrolyzing and re-esterifying fatty acids occupying external sn-1 and sn-3 positions of the triglycerides. With this treatment, the fatty acids of these external positions may be randomly re-distributed. Reformation of saturated triglycerides again allows extraction by means of one or more fractionation steps by crystallization. In this first embodiment, one therefore proceeds with one or more fractionation steps by crystallization followed by one or more enzymatic inter-esterification steps themselves followed again by one or more fractionation steps by crystallization.

Preferably, the starting products submitted to one or more enzymatic inter-esterification steps are preferably the liquid phase with a low melting point (olein 10° C. or olein 5° C.). The results are better when starting with oleins 5° C. which contain the least saturated fatty acids initially.

In the method of the invention, the inter-esterification and hydrolysis steps are carried out by a lipase, such as the lipase Lipozyme® TL IM of NOVOZYMES (Denmark).

Preferably, the conditions for hydrolysis reactions are a temperature comprised between about 60° C. and 90° C., preferably a temperature of the order of 70° C., for a minimum duration of 1 hour, preferably for a duration of the order of 6 hours.

In order to obtain an efficient reaction, the water contents of the reaction medium in this inter-esterification step, is preferably less than 0.1%, so as to allow rapid re-esterification of the fatty acids released by hydrolysis and by limiting the level of formed free fatty acids.

With enzymatic inter-esterification of the dairy fat and of its oleic fractions, trisaturated and mono-unsaturated triglycerides may be advantageously reformed. This reformation is expressed by an increase in the melting point and in the solid fat level at different temperatures of the treated fats. These modifications of triglyceride composition and modifications of the physical properties of crystallization are more marked for oleic fractions than for non-fractionated milk fat. They are all the more marked since the melting point of the treated oleic fraction is low. The enzymatic inter-esterification steps give more advantageous results if they are carried out on an oleic fraction of milk fat in which reformation of the crystallizable saturated triglycerides is increased as compared with non-fractionated milk fat. In this case, by adding to the method of the invention one or more fractionation steps by crystallization after the enzymatic inter-esterification step(s), it is again possible to obtain significant reduction in the percentages of saturated fatty acids in the final product. Advantageously, these fractionation steps by crystallization may be carried out at low temperature (for example at 15° C. and then at 2° C.) on an inter-esterified olein 5° C.

These effects of enzymatic inter-esterification on the crystallization properties (solid fat content and melting point) of cow milk fat and of its oleic fractions are illustrated in Table 4.

TABLE 4

| | Milk fat | | | Olein 20° C. | | | Olein 15° C. | | | Olein 10° C. | | | Olein 5° C. | | |
|---|---|---|---|---|---|---|---|---|---|---|---|---|---|---|---|
| | before | apres | diff. | before | after | diff. | before | after | diff. | before | after | diff. | before | after | diff. |
| Solid fat content at | | | | | | | | | | | | | | | |
| 5° C. | 48.9 | 51.3 | 2.4 | 32.5 | 37.3 | 4.8 | 20.7 | 29.6 | 8.9 | 9.1 | 26.8 | 17.7 | 1.5 | 23.1 | 21.6 |
| 10° C. | 37.7 | 41.2 | 3.5 | 19.8 | 26.6 | 6.8 | 6.8 | 20.4 | 13.5 | 1.8 | 18.3 | 16.5 | 0.2 | 15.0 | 14.8 |
| 15° C. | 26.7 | 32.7 | 6.0 | 5.8 | 18.7 | 12.9 | 0.6 | 14.1 | 13.5 | 0.6 | 12.1 | 11.5 | 0.0 | 9.5 | 9.5 |
| 20° C. | 18.5 | 25.6 | 7.1 | 0.8 | 12.7 | 11.9 | 0.0 | 9.6 | 9.6 | 0.2 | 7.0 | 6.8 | 0.0 | 5.0 | 5.0 |
| 25° C. | 12.0 | 18.4 | 6.4 | 0.6 | 8.2 | 7.6 | 0.0 | 7.2 | 7.2 | 0.0 | 3.8 | 3.8 | 0.0 | 1.5 | 1.5 |
| 30° C. | 6.0 | 11.4 | 5.4 | 0.0 | 6.0 | 6.0 | 0.0 | 5.4 | 5.4 | | | | | | |
| 35° C. | 1.1 | 5.1 | 4.1 | | | | | | | | | | | | |
| Melting point (° C.) | 33.0 | 37.6 | 4.6 | 21.2 | 35.1 | 13.9 | 14.6 | 30.9 | 16.3 | 11.0 | 27.0 | 16.0 | 6.1 | 26.7 | 20.6 |

Considering Table 4, it appears that the physical properties (solid fat level and melting point) of a ruminant, cattle, or cow milk fat and of its olein fractions before and after enzymatic inter-esterification are changed. Enzymatic inter-esterification actually causes hardening (illustrated by an increase in the melting temperature and in the solid fat level at temperatures below this melting point) of the ruminant, cattle or cow milk fat and especially of its oleins. These changes in physical properties are made without changing the fatty acid composition of the inter-esterified fats (cf. Table 5).

Advantageously, the products obtained by enzymatic inter-esterification may again be treated in one or more fractionation steps by crystallization in order to further reduce the saturated fatty acid level in the obtained composition. Thus, inter-esterified olein 5° C. has solid levels which are close to the oleins 15° C. and even to the non-inter-esterified oleins 20° C. Advantageously, a dual fractionation operation by crystallization was thereby able to be performed at 15° C., and then at 2° C. on inter-esterified olein 5° C. The result obtained for the oleins of both of these new fractionations is shown in Tables 5 and 6.

Table 5 shows the yields and the fatty acid composition of olein fractions obtained by fractionated crystallization of an olein 5° C. of inter-esterified milk fat.

TABLE 5

| | Olein 5° C. | Inter-esterified olein 5° C. | Olein 15° C. of inter-esterified olein 5° C. | Olein 2° C. of inter-esterified olein 5° C. |
|---|---|---|---|---|
| Fractionation yield | | | 75% | 70% |
| Yield relative to the start | 100% | 100% | 75% | 53% |
| Fatty acid (weight %): | | | | |
| C4 | 4.5 | 4.3 | 4.5 | 4.8 |
| C6 | 2.6 | 2.7 | 2.8 | 3.0 |
| C8 | 1.5 | 1.6 | 1.7 | 1.8 |
| C10 | 3.0 | 3.0 | 3.1 | 3.2 |
| C10:1 | 0.3 | 0.3 | 0.3 | 0.4 |
| C12 | 3.6 | 3.6 | 3.5 | 3.5 |
| C14 | 8.8 | 9.0 | 8.5 | 8.0 |
| C14:1 | 2.7 | 2.7 | 2.8 | 3.0 |
| C15 | 0.9 | 0.9 | 0.9 | 0.8 |
| C16 | 19.1 | 19.1 | 17.4 | 15.6 |
| C16:1 | 4.1 | 4.1 | 4.5 | 4.7 |
| C17 | 0.5 | 0.4 | 0.4 | 0.4 |
| C17:1 | 0.5 | 0.5 | 0.5 | 0.6 |
| C18 | 6.1 | 6.1 | 5.6 | 4.8 |
| C18:1 cis + trans | 36.6 | 36.6 | 38.1 | 39.8 |
| C18:2 cis-cis | 2.9 | 2.9 | 3.1 | 3.2 |

TABLE 5-continued

| | Olein 5° C. | Inter-esterified olein 5° C. | Olein 15° C. of inter-esterified olein 5° C. | Olein 2° C. of inter-esterified olein 5° C. |
|---|---|---|---|---|
| C18:2 conj. cis – trans | 1.3 | 1.3 | 1.4 | 1.5 |
| C18:3 | 0.8 | 0.8 | 0.9 | 0.9 |
| Sum of saturated fatty acids | 50.7 | 50.6 | 48.4 | 46.0 |
| Sum of mono-unsaturated (cis+ trans) fatty acids | 44.3 | 44.3 | 46.3 | 48.4 |
| Sum of poly-unsaturated (cis+ trans) fatty acids | 5.1 | 5.1 | 5.3 | 5.6 |

Table 6 shows physical properties (solid fat level and melting point) of olein fractions obtained by fractionated crystallization of an olein 5° C. of inter-esterified milk fat.

TABLE 6

| Solid fat content at | Olein 5° C. | Inter-esterified olein 5° C. | Olein 15° C. of inter-esterified olein 5° C. | Olein 2° C. of inter-esterified olein 5° C. |
|---|---|---|---|---|
| 5° C. | 1.4 | 23.1 | 12.8 | 1.8 |
| 10° C. | 0.0 | 15.0 | 5.7 | 0.0 |
| 15° C. | 0.0 | 9.5 | 0.8 | 0.0 |
| 20° C. | 0.0 | 5.0 | 0.0 | 0.0 |
| 25° C. | 0.0 | 1.5 | 0.0 | 0.0 |
| Melting point | 4.0 | 26.7 | 15.3 | 7.0 |

Advantageously, by combining one or more fractionation steps by crystallization followed by enzymatic inter-esterification itself followed by one or more fractionation steps by crystallization, it is possible to obtain a ruminant, cattle or cow milk fat fraction, for which the saturated fatty acid level is very significantly less than 50% and it may attain 46% in the present embodiment. This reduction level is impossible to attain with methods known from the state of the art. Further, the remaining saturated fatty acids are more strongly represented by short fatty acids, i.e., fatty acids with 4-10 carbon atoms characteristic of milk fat.

The thereby obtained product has a fraction depleted in saturated fatty acids with a very low melting point (below 10° C.).

According to a second preferred embodiment of the invention, one or more fractionation steps by crystallization and one or more fractionation steps by short path (molecular) distillation are combined.

In this preferred embodiment of the invention, the fat of the milk is preferably submitted to one or more fractionation steps by crystallization as described above followed by one or more fractionation steps by short path (molecular) distillation.

The fractionation by short path (molecular) distillation of an olein 15° C. (oleic fraction 15° C.) of ruminant, cattle or cow milk fat is carried out by evaporation temperatures comprised between about 200° C. and about 300° C., preferably between about 230° C. and about 270° C. in vacuo (i.e. at a pressure value less than 0.1 mbar, preferably less than 0.01 mbar). A fractionation step by short path (molecular) distillation of an olein 10° C. of milk fat is carried out at evaporation temperatures comprised between about 200° C. and about 300° C., preferably between about 230° C. and about 270° C., under the same vacuum conditions. Also, the fractionation by short path (molecular) distillation of an olein 5° C. of ruminant, cattle or cow milk fat is carried out at evaporation temperatures comprised between about 200° C. and about 300° C., preferably between about 230° C. and about 270° C. under the same vacuum conditions.

As described above, the liquid phase (olein) with a low melting point, obtained by fractionation, is treated by short path (molecular) distillation. The liquid phase has a low melting point, preferably an olein 15° C., more particularly an olein 10° C., even more preferably an olein 5° C.

Separation between these different oleins is carried out by methods known to one skilled in the art.

By applying one or more fractionation steps by short path (molecular) distillation of oleic fractions with a low melting point, a very large and unexpected additional reduction in the saturated fatty acid content is obtained in <<residual>> fractions. The <<residual>> fraction is the fraction of ruminant, cattle or cow milk fat which has not been evaporated during distillation. It consists of less saturated triglycerides with a higher molecular weight.

According to the known effects of short path (molecular) distillation (Patents AU 512606 and EP 0442184), a very strongly reduced cholesterol level is seen in <<residual>> fractions (a reduction level larger than or equal to 95%).

The data of these different examples are taken again in Tables 7 and 8.

Table 7 represents the yield, the fatty acid and cholesterol composition of residual fractions obtained by short path (molecular) distillation of olein fractions of milk fat.

TABLE 7

| | Olein 15° C. | | | Olein 10° C. | | | | Olein 5° C. | | | |
| --- | --- | --- | --- | --- | --- | --- | --- | --- | --- | --- | --- |
| | start | residue at 250° C. | residue at 270° C. | start | residue at 230° C. | residue at 250° C. | residue at 270° C. | start | residue at 230° C. | residue at 250° C. | residue at 270° C. |
| Fractionation yield | | 43% | 18% | | 67% | 40% | 17% | | 69% | 55% | 19% |
| Fatty acids (weight %) | | | | | | | | | | | |
| C4 | 4.1 | 0.7 | 0.1 | 4.1 | 2.1 | 0.5 | 0.1 | 4.2 | 2.3 | 0.9 | 0.2 |
| C6 | 2.5 | 0.7 | 0.1 | 2.6 | 1.7 | 0.6 | 0.1 | 2.7 | 1.8 | 0.9 | 0.2 |
| C8 | 1.4 | 0.6 | 0.1 | 1.6 | 1.1 | 0.6 | 0.1 | 1.7 | 1.2 | 0.8 | 0.2 |
| C10 | 2.8 | 1.7 | 0.5 | 3.0 | 2.3 | 1.6 | 0.5 | 3.2 | 2.4 | 1.9 | 0.7 |
| C10:1 | 0.3 | 0.2 | 0.0 | 0.3 | 0.2 | 0.2 | 0.0 | 0.3 | 0.2 | 0.2 | 0.1 |
| C12 | 3.3 | 2.2 | 1.0 | 3.4 | 2.6 | 2.2 | 1.0 | 3.6 | 2.7 | 2.4 | 1.3 |
| C14 | 9.8 | 7.3 | 5.2 | 9.5 | 7.6 | 6.9 | 4.9 | 9.0 | 7.3 | 6.7 | 5.2 |
| C14:1 | 2.3 | 2.3 | 1.5 | 2.3 | 2.4 | 2.4 | 1.5 | 2.5 | 2.5 | 2.6 | 1.9 |
| C15 | 1.0 | 0.8 | 0.7 | 1.1 | 1.0 | 0.8 | 0.7 | 0.9 | 0.8 | 0.8 | 0.7 |
| C16 | 23.1 | 19.7 | 18.1 | 20.3 | 18.6 | 17.2 | 16.0 | 18.8 | 17.5 | 16.3 | 15.3 |
| C16:1 | 3.6 | 4.0 | 3.6 | 3.7 | 4.0 | 4.1 | 3.7 | 3.9 | 4.1 | 4.3 | 4.1 |
| C17 | 0.6 | 0.6 | 0.6 | 0.5 | 0.6 | 0.6 | 0.6 | 0.5 | 0.5 | 0.5 | 0.5 |
| C17:1 | 0.4 | 0.5 | 0.5 | 0.5 | 0.5 | 0.6 | 0.6 | 0.5 | 0.6 | 0.6 | 0.6 |
| C18 | 7.9 | 9.3 | 10.8 | 7.3 | 8.1 | 8.7 | 10.0 | 6.5 | 7.3 | 7.7 | 8.6 |
| C18:1 cis + trans | 32.5 | 43.5 | 50.2 | 35.0 | 41.5 | 46.6 | 52.9 | 36.6 | 42.8 | 46.9 | 52.8 |
| C18:2 cis-cis | 2.7 | 3.5 | 4.0 | 2.9 | 3.4 | 3.7 | 4.2 | 3.1 | 3.6 | 3.9 | 4.3 |
| C18:2 conj. cis – trans | 1.0 | 1.6 | 1.9 | 1.1 | 1.4 | 1.7 | 2.0 | 1.2 | 1.5 | 1.7 | 2.0 |
| C18:3 | 0.7 | 0.9 | 1.0 | 0.8 | 0.9 | 1.0 | 1.1 | 0.8 | 1.0 | 1.0 | 1.1 |
| Total saturated fatty acids | 56.6 | 43.6 | 37.2 | 53.4 | 45.7 | 39.8 | 33.9 | 51.1 | 43.7 | 38.8 | 33.1 |
| Total mono-unsaturated (cis + trans) fatty acid | 39.0 | 50.4 | 55.8 | 41.9 | 48.6 | 53.9 | 58.8 | 43.8 | 50.2 | 54.6 | 59.5 |
| Total polyunsaturated (cis + trans) fatty acids | 4.4 | 6.0 | 6.9 | 4.7 | 5.7 | 6.4 | 7.3 | 5.1 | 6.0 | 6.6 | 7.5 |
| Cholesterol (mg/100 g) | 377 | 13 | 11 | 410 | 20 | 11 | <10 | 450 | 23 | 14 | <10 |

Table 8 represents the physical properties (solid fat level and melting point) of residual fractions obtained by short path (molecular) distillation of olein fractions of milk fat.

TABLE 8

| | Olein 15° C. | | | Olein 10° C. | | | | Olein 5° C. | | | |
| --- | --- | --- | --- | --- | --- | --- | --- | --- | --- | --- | --- |
| | start | residue at 250° C. | residue at 270° C. | start | residue at 230° C. | residue at 250° C. | residue at 270° C. | start | residue at 230° C. | residue at 250° C. | residue at 270° C. |
| Solid fat content at | | | | | | | | | | | |
| 5° C. | 22.7 | 46.6 | 44.6 | 8.8 | 25.7 | 36.3 | 31.0 | 1.1 | 14.6 | 23.0 | 21.3 |
| 10° C. | 9.0 | 28.9 | 25.8 | 1.0 | 8.1 | 16.8 | 12.7 | 0.0 | 2.1 | 5.1 | 3.4 |

TABLE 8-continued

| | Olein 15° C. | | | Olein 10° C. | | | | Olein 5° C. | | | |
|---|---|---|---|---|---|---|---|---|---|---|---|
| | start | residue at 250° C. | residue at 270° C. | start | residue at 230° C. | residue at 250° C. | residue at 270° C. | start | residue at 230° C. | residue at 250° C. | residue at 270° C. |
| 15° C. | 1.0 | 11.5 | 9.5 | 0.0 | 0.5 | 1.6 | 0.7 | 0.0 | 0.0 | 0.0 | 0.0 |
| 20° C. | 0.0 | 0.6 | 0.5 | 0.0 | 0.0 | 0.0 | 0.0 | 0.0 | 0.0 | 0.0 | 0.0 |
| 25° C. | 0.0 | 0.0 | 0.0 | 0.0 | 0.0 | 0.0 | 0.0 | 0.0 | 0.0 | 0.0 | 0.0 |
| Melting point (° C.) | 14.7 | 20.0 | 19.5 | 9.5 | 14.7 | 16.8 | 16.0 | 4.0 | 12.6 | 13.8 | 12.9 |

By combining the physical methods of fractionated crystallization and of short path (molecular) distillation, it is possible to obtain milk fat fractions for which the saturated fatty acid level is very significantly less than 50%, depending on the oleic fractions used, and on the evaporation temperature conditions of the short path (molecular) distillation treatment; the obtained <<residual>> fractions have a saturated fatty acid content comprised between about 45.7 and about 33.1%, a mono-unsaturated fatty acid content comprised between 48.6 and 59.5%, and a polyunsaturated fatty acid content comprised between 5.7 and 7.5%, without any significant modification of the <<omega-6/omega-3>> ratio. These changes in the fatty acid composition of the milk fat are impossible to achieve with the methods described in the state of the art.

With the exception of stearic acid (C18), a fatty acid recognized as being non-hypercholesterolemic, short path (molecular) distillation reduces the proportion of the whole of the saturated fatty acids, but more strongly reduces saturated short chain fatty acids.

By applying short path (molecular) distillation, fractions depleted in saturated fatty acids also have strongly reduced cholesterol contents (removal of at least 95% of the cholesterol initially present in the milk fat).

Further, these so-called <<residual>> fractions depleted in saturated fatty acids and in cholesterol of the invention have improved physical properties (melting point and solid level are changed). The solid level which is equal to the solid fat level at a given temperature is strongly changed. The higher this solid level value, the firmer is the fat at the relevant temperature. This characteristic is essential for certain applications such as spreadable fats (butter, . . . ), for which the solid level should be above 10%, preferably above 15%. For emulsions of the <<oil-in-water>> type (milk, cooking cream, cheeses, yogurts, . . . , ), this characteristic is less important. However, by the changes in the physical properties of the products obtained from the invention, it is possible to widen their possibilities of applications in particular because their melting point is then comprised between 13 and 20° C.

According to a preferred embodiment of the invention, the method of the invention may be applied on a ruminant, cattle or cow milk fat having a lower saturated fatty acid content than that of a standard product (as shown in Table 1) in particular starting from milk originating from dairy cows, the feed of which was enriched with a feed rich in polyunsaturated fatty acids for example a feed based on linseed oil or soybean oil.

The present invention also relates to food compositions comprising the milk fat fractions of the invention. These fractions may be present as a mixture in order to reduce the effects induced by the extreme characteristics of the obtained fractions such as the reduction in the short chain fatty acid levels or the fluidity of the obtained fractions. The product of the invention, in particular the novel fractions obtained by the method of the invention, find very different applications in particular in dairy products of the type of milk, cream, cheese, fermented milk, flavored milk, desserts, etc. i.e. for all applications of the <<oil-in-water>> type.

Also, the product of the invention (novel fractions) may find advantageous applications in bakery-confectionery products, such as pancake batter, choux pastry, cake pastry, dough for brioche. When the product of the invention is used in a mixture with a low (10-20%) proportion of stearin fraction with a high melting point, with the novel oleic fraction with a low level of saturated fatty acids, it is possible to produce preferably low-calorie and spreadable butter, the fat of which contains only 44% of saturated fatty acids against about 60% for butters or low-calorie spreadable butters enriched with standard olein fraction.

Further, the product of the invention, in particular the novel <<residual>> fractions with a low level of saturated fatty acids and a low percentage of cholesterol may find advantageous applications in food compositions. The product of the invention may also be used for daily consumption of fatty dairy products in order to reduce the risk of cardiovascular diseases.

Examples of Application

Recombined low fat cream cheese (13.5% fat) A recombined cream cheese has been prepared by using a low saturated milk fat fraction obtained after a sequence of multi-step fractionated crystallization and a fractionation by short path distillation (residue at 250° C. of a milk fat olein 10° C.). As shown on tables 7 and 8, this fraction has a saturated fatty acids content of 39.8%, a cholesterol content of 11 mg per 100 g, a melting point of 16.8° C. and a solid fat contents of 36.3%, 16.8% and 1.6% respectively at 5° C., 10° C. and 15° C.

The formulation and the procedure used to prepare 60 kg of recombined low fat cream cheese are given hereunder:

| Formulation: | |
|---|---|
| skim milk | 45.95 kg (76.57%) |
| low saturated milk fat fractions | 7.94 kg (13.23%) |
| milk proteins | 4.50 kg (7.50%) |
| sweet buttermilk powder | 0.39 kg (0.65%) |
| salt | 0.48 kg (0.80%) |
| thickeners | 0.63 kg (1.05%) |
| potassium sorbate | 0.06 kg (0.10%) |
| yoghurt culture (Danisco) | 0.06 kg (0.10%) |

Procedure:
Except yoghurt culture and potassium sorbate, all dry ingredients are dispersed and solubilized in the skim milk at 65° C.
Low saturated milk fat fraction is added and emulsified with a high shear mixer at 65° C.

The mix is heated at 80° C. and pasteurized in batch at 80° C. for 15 minutes.

The mix is cooled down at 44° C.

Yoghurt culture is added and fermentation is performed at 44° C. during around 4 hours until the pH drops at 4.7.

The product is reheated at 65° C. for 15 minutes and potassium sorbate is added.

Then the product is pumped, homogenized at 500 bar and poured in cup at 65° C.

The product is cooled down at 6° C. and stored in a refrigeration room.

In comparison with a reference recombined low fat cream cheese made with standard Anhydrous Milk Fat, the product prepared with the Anhydrous Milk Fat fraction has a comparable taste and texture at refrigeration temperature and at normal ambient temperature (+/−20° C.). Due to the specific milk fat fraction used, the nutritional value of the test cream cheese is highly improved:

saturated fat content: 5.2 g/100 g instead of 9.0 g/100 g for the reference product (42% reduction), cholesterol content: 2 mg/100 g instead of 40 mg/100 g for the reference product (95% reduction).

Low Fat Butter (41% Fat)

A low fat butter (41% fat) has been produced by using a low saturated milk fat fraction obtained after a sequence of multi-step fractionated crystallization and a fractionation by short path distillation (residue at 250° C. of a milk fat olein 10° C.). As shown on tables 7 and 8, this fraction has a saturated fatty acids content of 39.8%, a cholesterol content of 11 mg per 100 g, a melting point of 16.8° C. and a solid fat contents of 36.3%, 16.8% and 1.6% respectively at 5° C., 10° C. and 15° C.

The low fat butter is a water in oil emulsion and the physical properties of the fat (melting point, solid fat content at 5, 10 and 15° C.) are important for its right texture.

To be spreadable at low temperature (i.e. 5° C.) and still solid at ambient temperature, the milk fat must have a solid fat content at 5° C. of maximum 40% and a melting point above 25° C. To obtain these, the fat phase of the low fat butter has been prepared by mixing 85% of the low saturated milk fat fraction with 15% of the milk fat stearin fraction (high melting point) obtained by the first step of fractionated crystallization.

The formulation and the procedure used to prepare 60 kg of recombined low fat butter are given hereunder:

| Formulation: | |
|---|---|
| Fat phase: | |
| low saturated milk fat fraction | 20.60 kg (34.33%) |
| milk fat stearin fraction | 3.64 kg (6.07%) |
| emulsifiers | 0.72 kg (1.20%) |
| Colour: beta carotene | 0.9 g (0.0015%) |
| Water phase: | |
| water | 30.12 kg (50.20%) |
| modified starch | 2.64 kg (4.40%) |
| lactose | 1.08 kg (1.80%) |
| salt | 0.24 kg (0.40%) |
| potassium sorbate | 0.06 kg (0.10%) |
| natural butter aroma (lactic acid + diacetyl) | 0.90 kg (1.50%) |

Procedure:

The at phase and the water phase are prepared separately. The fat phase is prepared by mixing all ingredients at 50° C.

The water phase is prepared by dispersing and/or dissolving all ingredients in the water at 65° C.

The water phase is poured in the fat phase and the emulsion "water in oil" is build by a rotor/stator mixer at 57° C.

The emulsion is pumped through a continuous fat spread production line (Kombinator Schroeder pilot plant) in which it is pasteurized (85° C., 15 sec), cooled and precrystallized (until 10° C.) and worked (pin-worker at 14° C.)

The spread is packed in tub and stored at refrigeration temperature.

In comparison with a reference low fat butter made with a standard milk fat, the product prepared with the blend of milk fat fractions has a very good spreadability at refrigeration temperature and a very good texture at 20° C. (no oiling off). Its taste is normal and creamy. Due to the specific milk fat fraction used and even with the addition of the milk fat stearin, the nutritional value of the low fat butter is highly improved:

saturated fat content: 18.1 g/100 g instead of 27.1 g/100 g for the reference product (33% reduction), cholesterol content: 17 mg/100 g instead of 115 mg/100 g for the reference product (85% reduction).

Hard Cheese (Full Fat)

A hard cheese (26% fat, 50% fat on dry matter) has been produced by using a low saturated milk fat fraction obtained after a sequence of multi-step fractionated crystallization and a fractionation by short path distillation (residue at 250° C. of a milk fat olein 10° C.). As shown on tables 7 and 8, this fraction has a saturated fatty acids content of 39.8%, a cholesterol content of 11 mg per 100 g, a melting point of 16.8° C. and a solid fat contents of 36.3%, 16.8% and 1.6% respectively at 5° C., 10° C. and 15° C.

The formulation of the milk and the procedure used to prepare the hard cheese are given hereunder:

| Formulation of the cheese milk: | |
|---|---|
| Recombined cream (22.5% fat) | 52.5 kg (21.0%) |
| skim milk | 26.75 kg (10.7%) |
| water | 12.75 kg (5.1%) |
| sweet buttermilk powder | 1.5 kg (0.6%) |
| low saturated milk fat fraction | 11.5 kg (4.6%) |
| skim milk | 160.0 kg (64.0%) |
| skim milk retentate (ultrafiltred) | 37.5 kg (15.0%) |

Procedure:

The recombined cream is prepared by mixing at 50° C. the skim milk, the water in which the sweet buttermilk has been dispersed and the low saturated milk fat fraction. The recombined cream is homogenized at 150/50 bar (2 stages) and cooled at a temperature lower than 10° C. before its use.

The cheese milk is prepared by mixing the recombined cream with the skim milk and the skim milk retentate. The cheese milk obtained has a fat content of 42 g/l, a protein content of 40 g/l and a lactose content of 47 g/l.

The cheese milk is pasteurized at 72° C. for 30 sec and cooled down at 10° C. before its use.

The cheese milk is heated at 34° C. Mesophilic lactic culture is added and at pH 6.45, rennet is added.

The cheese milk coagulates in a cheese vat within 12 minutes. After 20 minutes, the curd is cut and stirred during 15 minutes. The whey is drained off and the curd is moulded. The curd is then pressed during 80 minutes. After the pressing, the pH of the curd is 5.5.

Salting is performed in brine during 20 hours for cheese blocks of 12 kg.

Ripening is completed during 30 days in a room at 15° C. with a hygrometry of 90%. The cheese is packed after 11 days. It shows a total solid content of 53%, a fat content of 26.5% and a pH of 5.25.

The cheese is stored at refrigeration temperature.

In comparison with a reference cheese made with standard milk fat (or cream), the product prepared with the low saturated milk fat fractions shows a good taste; its texture is very acceptable and is slightly softer than the reference. Due to the specific milk fat fraction used, the nutritional value of the test cheese is highly improved:

saturated fat content: 10.5 g/100 g instead of 17.5 g/100 g for the reference product (40% reduction), cholesterol content: 4 mg/100 g instead of 75 mg/100 g for the reference product (95% reduction).

Pastry/biscuit application: "Financier" cake Some pastries and biscuits can be prepared with liquid butter. Many types of cakes are members of these pastries/biscuits. "Financier" cake is a good example as it may contain an important part of fat but does not contain egg yolk which is another source of cholesterol. This "Financier" cake has been prepared by using a low saturated milk fat fraction obtained after a sequence of multi-step fractionated crystallization and a fractionation by short path distillation (residue at 250° C. of a milk fat olein 10° C.). As shown on tables 7 and 8, this fraction has a saturated fatty acids content of 39.8%, a cholesterol content of 11 mg per 100 g, a melting point of 16.8° C. and a solid fat contents of 36.3%, 16.8% and 1.6% respectively at 5° C., 10° C. and 15° C.

The recipe and procedure used are given hereunder:

| Recipe: | |
|---|---|
| low saturated milk fat fraction | 450 g (22.4%) |
| almond powder | 500 g (24.9%) |
| icing sugar | 500 g (24.9%) |
| egg whites | 500 g (24.9%) |
| flour | 60 g (3.0%) |

Procedure:

Mix on slow speed the almond powder, icing sugar and egg whites.

Incorporate the sifted flour.

Add the low saturated milk fat fraction and give a rest in the fridge.

Bake for about 14 minutes at 200° C.

After baking, the "Financier" cake contains around 13% humidity and 39% fat.

In comparison with a reference "Financier" cake made with standard liquid butterfat, the test cake prepared with the low saturated milk fat fractions shows a normal texture and an acceptable taste. Due to the specific milk fat fraction used, the nutritional value of the test "Financier" cake is highly improved:

saturated fat content: 11.2 g/100 g instead of 17.8 g/100 g for the reference product (37% reduction), cholesterol content: 3 mg/100 g instead of 70 mg/100 g for the reference product (96% reduction).

The invention claimed is:

1. A method for obtaining a milk fat comprising a saturated fatty acid content less than 50% by weight based on total fatty acids, said method comprising the sequential steps of:

submitting a ruminant milk fat to one or more fractionation steps by crystallization performed at temperatures between 2° C. and 20° C.;

recovering an olein fraction after said fractionalization by crystallization;

submitting said olein fraction to a fractionation step or by or one or more fractionation steps by short path distillation performed at evaporation temperatures between 200° C. and 300° C. at a pressure less than 0.1 mbar; and recovering a residual fraction which has not been evaporated.

2. The method according to claim 1, wherein the one or more fractionation steps by short path distillation are carried out at evaporation temperatures comprised between 200° C. and 270° C., at a pressure less than 0.01 mbar.

3. A method for obtaining milk fat comprising saturated fatty acid content less than 50% by weight based on total fatty acids, the method comprising the steps of:

submitting a ruminant milk fat to one or more fractionalization steps by crystallization performed at temperatures between 2° C. and 20° C.;

recovering an olein fraction;

submitting the olein fraction to one or more enzymatic inter-esterification;

submitting the inter-esterified fat to one or more subsequent fractionalization steps by crystallization performed at temperatures between 2° C. and 20° C.; and recovering an olein fraction after the subsequent fractionalization by crystallization.

4. The method according to the claim 3, wherein the enzymatic inter-esterification step(s) correspond (s) to an hydrolysis with a lipase at a temperature comprised between 60° C. and 90° C., for a duration above 1 hour, at a temperature of about 70° C. for a duration of about 6 hours.

5. The method according to claim 3, wherein the water content of the reaction medium of the inter-esterification step is less than 0.1%.

* * * * *